US010367824B2

(12) United States Patent
Weintraub et al.

(10) Patent No.: US 10,367,824 B2
(45) Date of Patent: Jul. 30, 2019

(54) POLICY MANAGEMENT, ENFORCEMENT, AND AUDIT FOR DATA SECURITY

(71) Applicant: BlueTalon, Inc., Redwood City, CA (US)

(72) Inventors: Benjamin L. Weintraub, Sunnyvale, CA (US); Pratik Verma, Hopkins, MN (US)

(73) Assignee: BlueTalon, Inc., Redwood City, CA (US)

( * ) Notice: Subject to any disclaimer, the term of this patent is extended or adjusted under 35 U.S.C. 154(b) by 0 days.

(21) Appl. No.: 16/147,364

(22) Filed: Sep. 28, 2018

(65) Prior Publication Data

US 2019/0036941 A1    Jan. 31, 2019

Related U.S. Application Data

(63) Continuation of application No. 15/061,991, filed on Mar. 4, 2016, now Pat. No. 10,091,212.

(51) Int. Cl.
*H04L 29/06* (2006.01)
*G06F 21/62* (2013.01)

(52) U.S. Cl.
CPC ........ *H04L 63/107* (2013.01); *G06F 21/6218* (2013.01); *H04L 63/102* (2013.01); *H04L 63/20* (2013.01); *H04L 63/205* (2013.01)

(58) Field of Classification Search
CPC ... H04L 63/107; H04L 63/205; H04L 63/102; H04L 63/20; G06F 21/6218
See application file for complete search history.

(56) References Cited

U.S. PATENT DOCUMENTS

| 5,537,548 A | 7/1996 | Fin |
| 6,463,470 B1 | 10/2002 | Mohaban |
| 6,687,229 B1 | 2/2004 | Kataria |
| 7,185,192 B1 | 2/2007 | Kahn |

(Continued)

OTHER PUBLICATIONS

Marenco et al. "Achieving Evolvable Web-Database Bioscience Applications Using the EAV/CR Framework: Recent Advances", Journal of the American Medical Informatics Association, vol. 10, Issue 5, Sep. 1, 2003, pp. 444-453 (Year: 2003).*

(Continued)

*Primary Examiner* — Kenneth W Chang
(74) *Attorney, Agent, or Firm* — Fish & Richardson P.C.

(57) ABSTRACT

Methods, systems, and apparatus, including computer programs encoded on computer storage media, for managing, and enforcing policies on data security. A policy appliance includes a policy administration point, a policy decision point, a policy enforcement point and, optionally, an auditing module. The policy appliance can execute in a self-contained environment, e.g., a single virtual machine, a single physical machine, or a cluster of virtual machines or physical machines identically configured. The self-contained policy appliance can receive, manage, enforce and audit multiple policies that specify access privileges of multiple users on multiple databases. The databases can include heterogeneous databases that are configured separately and differently from one another. A single configuration of the policy appliance centralizes and unifies policy management of the heterogeneous database in the self-contained environment.

19 Claims, 4 Drawing Sheets

(56) References Cited

U.S. PATENT DOCUMENTS

| | | | |
|---|---|---|---|
| 7,542,943 B2 | 6/2009 | Caplan | |
| 7,631,084 B2 | 12/2009 | Thomas | |
| 7,730,089 B2 | 6/2010 | Campbell | |
| 8,181,221 B2 | 5/2012 | Manickam et al. | |
| 8,613,108 B1 | 12/2013 | Aggarwal | |
| 8,677,447 B1 | 3/2014 | Zuk et al. | |
| 9,071,594 B2 | 6/2015 | Boulos et al. | |
| 9,785,669 B2* | 10/2017 | Buschman | G06F 17/30398 |
| 9,866,592 B2 | 1/2018 | Arumugam et al. | |
| 9,871,825 B2 | 1/2018 | Arumugam et al. | |
| 2002/0007404 A1 | 1/2002 | Vange | |
| 2002/0019828 A1 | 2/2002 | Mortl | |
| 2002/0169907 A1 | 11/2002 | Candea | |
| 2003/0018786 A1 | 1/2003 | Lortz | |
| 2003/0021283 A1 | 1/2003 | See | |
| 2003/0046315 A1 | 3/2003 | Feig | |
| 2003/0115322 A1 | 6/2003 | Moriconi | |
| 2004/0039736 A1* | 2/2004 | Kilmer | G06F 16/283 |
| 2004/0054791 A1 | 3/2004 | Chakraborty | |
| 2004/0073668 A1 | 4/2004 | Bhat | |
| 2004/0088560 A1 | 5/2004 | Danks | |
| 2005/0021978 A1 | 1/2005 | Bhat | |
| 2005/0091212 A1 | 4/2005 | Mohamed et al. | |
| 2006/0053216 A1 | 3/2006 | Deokar | |
| 2006/0218149 A1* | 9/2006 | Patrick | G06F 21/6218 |
| 2006/0277220 A1 | 12/2006 | Patrick et al. | |
| 2007/0124797 A1 | 5/2007 | Gupta | |
| 2007/0174831 A1 | 7/2007 | Lee | |
| 2007/0234408 A1 | 10/2007 | Burch | |
| 2008/0066148 A1 | 3/2008 | Lim | |
| 2008/0301437 A1 | 12/2008 | Chevalier | |
| 2009/0049512 A1 | 2/2009 | Manickam et al. | |
| 2009/0199302 A1 | 8/2009 | So et al. | |
| 2010/0024019 A1 | 1/2010 | Backlund | |
| 2010/0235396 A1 | 9/2010 | Chaurasia et al. | |
| 2010/0281524 A1 | 11/2010 | Ghittino | |
| 2010/0313239 A1 | 12/2010 | Chakra et al. | |
| 2011/0072486 A1 | 3/2011 | Hadar et al. | |
| 2011/0209194 A1 | 8/2011 | Kennedy | |
| 2011/0251992 A1 | 10/2011 | Bethlehem et al. | |
| 2011/0313981 A1* | 12/2011 | Ben-Natan | G06F 17/30477 707/694 |
| 2012/0198467 A1 | 8/2012 | Jackson | |
| 2013/0054642 A1* | 2/2013 | Morin | G06F 16/24544 707/770 |
| 2013/0117313 A1 | 5/2013 | Miao | |
| 2013/0144901 A1 | 6/2013 | Ho | |
| 2013/0332982 A1 | 12/2013 | Rao et al. | |
| 2014/0052749 A1 | 2/2014 | Rissanen | |
| 2014/0068699 A1 | 3/2014 | Balacheff | |
| 2014/0090085 A1 | 3/2014 | Mattsson et al. | |
| 2014/0128053 A1 | 5/2014 | Merchant | |
| 2014/0129936 A1 | 5/2014 | Richards et al. | |
| 2014/0196115 A1 | 7/2014 | Pelykh | |
| 2014/0351573 A1 | 11/2014 | Martini | |
| 2015/0113010 A1 | 4/2015 | Muthyala et al. | |
| 2015/0128205 A1 | 5/2015 | Mahaffey | |
| 2015/0200922 A1 | 7/2015 | Eschbach et al. | |
| 2016/0085962 A1 | 3/2016 | Sokolov et al. | |
| 2016/0119349 A1 | 4/2016 | Wang et al. | |
| 2016/0149859 A1 | 5/2016 | Curtis | |
| 2016/0205101 A1 | 7/2016 | Verma et al. | |
| 2016/0342803 A1 | 11/2016 | Goodridge | |
| 2017/0012962 A1 | 1/2017 | Lissack | |
| 2017/0093925 A1 | 3/2017 | Sheretov | |
| 2017/0208033 A1 | 7/2017 | Roskind | |
| 2017/0257379 A1 | 9/2017 | Weintraub et al. | |
| 2018/0131726 A1 | 5/2018 | Arumugam et al. | |
| 2018/0131727 A1 | 5/2018 | Arumugam et al. | |

OTHER PUBLICATIONS

Medeiros et al., A proposal for customizing queries on XML documents based on conditional preferences, Oct. 2015, Latin American Computing Conference, pp. 1-8 (Year: 2015).*

PCT International Search Report in International Application No. PCT/US2018/017698, dated May 21, 2018, 3 pages.

International Application No. PCT/US2016/054107, Notification of Transmittal of the International Search Report and the Written Opinion of the International Searching Authority, dated Jan. 9, 2017, 13 pages.

International Application No. PCT/US2016/065853, Notification of Transmittal of the International Search Report and the Written Opinion of the International Searching Authority, dated Mar. 24, 2017, 14 pages.

International Application No. PCT/US2017/020766, Notification of Transmittal of the International Search Report and the Written Opinion of the International Searching Authority, dated Jun. 8, 2017, 12 pages.

Zeng et al., "Content-Based Access Control: Use Data Content to Assist Access Control for Large-Scale Content-Centric Databases", Oct. 2014, IEEE International Conference on Big Data, pp. 2584-2589 (2014).

* cited by examiner

POLICY MANAGEMENT, ENFORCEMENT, AND AUDIT FOR DATA SECURITY

CROSS-REFERENCE TO RELATED APPLICATIONS

This application is a continuation application of and claims priority to U.S. application Ser. No. 15/061,991, filed on Mar. 4, 2016.

BACKGROUND

In a distributed data storage system, data can be stored in multiple databases. Various applications from business users, data scientists, analysts or developers can access the data. Each application can correspond to a specific user or a specific group of users. Each user or group of users can have particular access privileges to certain portions of the data. Various data security policies can specify which user can access which data. Each database can be associated with a respective policy component that controls access privileges to that database. The databases in the distributed data storage system can be located virtually or physically separate from one another. Accordingly, the multiple databases can correspond to multiple policy components that work separately from one another. In a distributed data storage system that includes multiple and separate policy components each policy component may need to be configured individually.

SUMMARY

In general, this specification describes a distributed data storage system where a centralized and self-contained policy appliance manages data security policies for multiple databases.

A system of policy management, enforcement and audit for data security can perform a method that includes receiving, by a policy administration point of a policy appliance, a policy that defines an access privilege of a user on data stored in a database. The method includes submitting the policy by the policy administration point to a policy decision point of the policy appliance that is configured to decide whether the user is permitted to access at least a portion of the data according to the policy. The method includes receiving, by a policy enforcement point of the policy appliance, a data request from an application, the request including a user specification specifying the user and a data specification specifying a data item of the data to access. The method includes submitting the user specification and the data specification to the policy decision point by the policy enforcement point. The method includes receiving, by the policy enforcement point and from the policy decision point, a data access decision that is made by the policy decision point according to the policy, the data access decision specifying that the user is permitted to access a portion of the data item. The method includes providing, by the policy enforcement point to the application, a redacted data item as a response to the request according to the data access decision. The policy appliance, including each of the policy administration point, the policy decision point, and the policy enforcement point, executes in a container on a system that includes one or more computer processors.

Particular embodiments of the subject matter described in this specification can be implemented to realize one or more advantages. For example, conventionally, policy management system setup is performed at deployment time. The centralized and unified policy management system and enforcement moves the complexity of the policy management system setup from deployment time to development time. Accordingly, the techniques described in this specification allows for easier and quicker deployment of data security tools.

The techniques described in this specification can avoid individually configuring different types of databases in a distributed data storage system. A single configuration is applied to all different types of databases. Using policies, the policy appliance can mask particular portions of data retrieved by database queries. For example, the policy appliance can mask sensitive data, e.g., personally identifiable information such as social security numbers or dates of birth. In addition, the policy appliance can filter out certain records based on the data in the record. For example, a policy could allow only access to records record with a particular field F having value X. Accordingly, the policy appliance can provide an additional layer of privacy for user data stored in a file system.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

Like reference numbers and designations in the various drawings indicate like elements.

DETAILED DESCRIPTION

In one aspect, a policy appliance includes a policy administration point, a policy decision point, a policy enforcement point and, optionally, an auditing module. The policy appliance can execute in a self-contained environment, e.g., a single virtual machine, a single physical machine or a cluster of virtual machines or physical machines identically configured. The self-contained policy appliance can receive, manage, enforce and audit multiple policies that specify access privileges of multiple users on multiple databases. The databases can include heterogeneous databases that are configured separately and differently from one another. A single configuration of the policy appliance centralizes and unifies policy management of the heterogeneous database in the self-contained environment.

Figure 1:
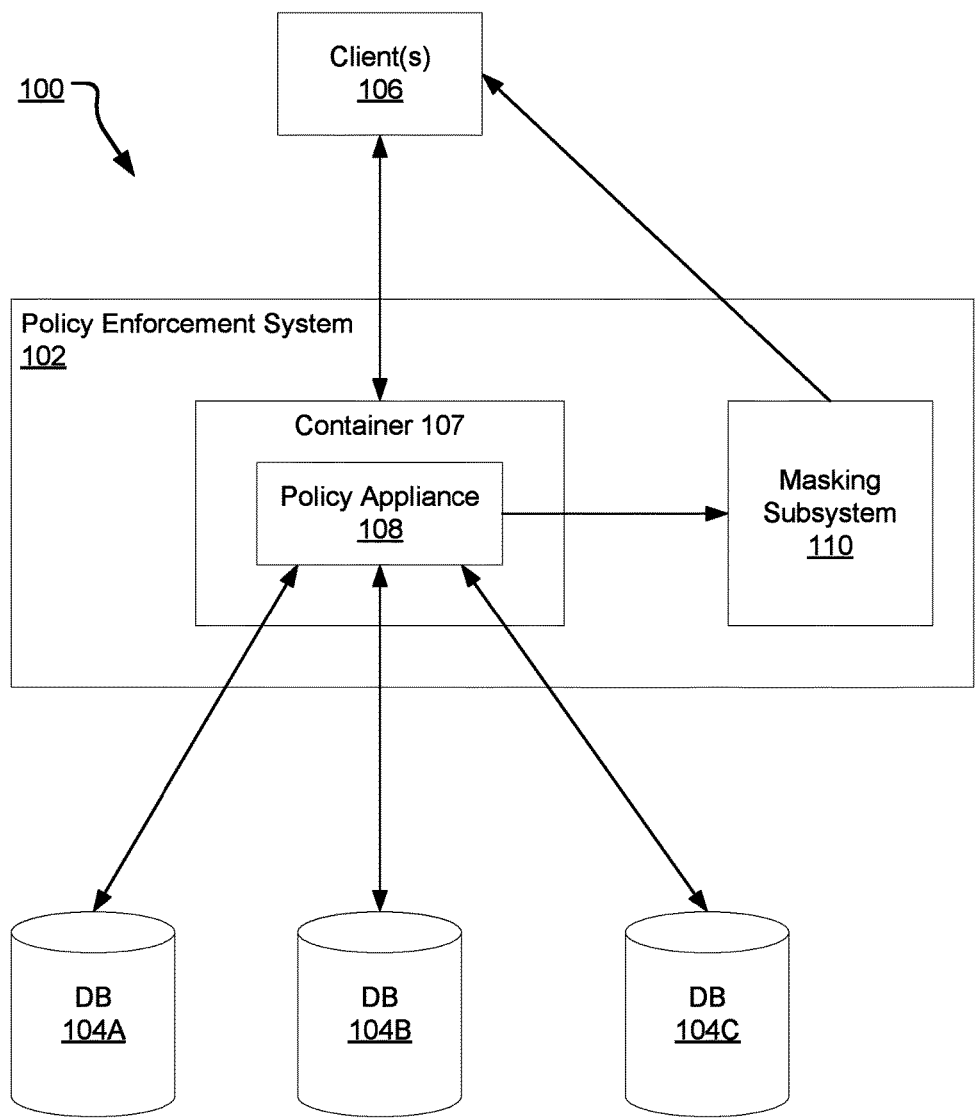
FIG. 1 illustrates an architecture of an example distributed data storage system.

FIG. 1 illustrates an architecture of an example distributed data storage system 100 for storing data. The distributed data storage system 100 includes policy enforcement system 102 and databases 104A, 104B and 104C. The databases 104A, 104B and 104C can have different architectures. For example, the databases 104A, 104B and 104C can include one or more relational database, object-oriented databases or storage systems for unstructured files. In some implementations, each of the databases 104A, 104B and 104C can be a node of a Hadoop Distributed File System (HDFS). Each node can include, or be hosted on, a respective server computer.

One or more clients 106 can access the data stored in databases 104A, 104B and 104C. Clients 106 can correspond to one or more users. Each user has an identifier and credentials. A user can use multiple clients 106. Each client 106 can be used by multiple users. Different users of the clients 106 can have different access privileges to various data items in the data. The access privileges can be privileges based on a condition, e.g., a time of day, a value of a data item, or an output of a function or stored procedure. The access privileges can specify ways that a user can access a particular data item such as read-only, read-write, or create. For example, a first user can have privileges to access a specific database, a specific table in a database, a specific column in a database table, or a row in a database table. The first user may not have privileges to access other databases, tables, columns or rows. The second user may have privileges to view certain data, but only if a portion of the data is redacted (e.g., masked or partially deleted from view).

In the distributed data storage system 100, a data access policy, or simply referred to as a policy, can define these access privileges on various data items for each user. A data item can be a value or a set of values that is identifiable by a reference (e.g., by name or by another form of identifier). Example data items can include a database, a database table, a column in a database table, a row in a database table, an unstructured file, or any combination of the above. A data access policy can specify that a user, or a group of users, identified by user identifier U, can access columns C1 and C2 in database table T in database 104A during time period P. In addition, the data access policy can specify user U can only assess those rows in table T having a value in column C3 that is between values V1 and V2, where V1 and V2 are outputs of functions F1 and F2.

The policy enforcement system 102 is programmed to manage, enforce, and audit policies for accessing the data stored in databases 104A, 104B and 104C. The policy enforcement system 102 can include a container 107 in which a policy appliance 108 performs the various functions regarding policies. The container 107 can be a virtualized or physical server that provides an isolated, self-contained, and individually configured user space in a cloud-computing environment. Each container can have a respective set of configuration parameters, e.g., class paths, directory mappings, and environment variables, that are independent from configuration parameters of other containers. The container 107 can be a unit in the cloud-computing environment in which programs execute. For example, the container 107 can be a single physical computer or a single virtual machine. The functions of the policy appliance 108 can be self-contained, all executing in a single container. Compared to conventional distributed access control systems, this self-contained setup can facilitate quick and easy deployment for the user.

The functions performed by the policy appliance 108 can include managing policies, including, for example, adding a policy for a user or for a group of users, editing an existing policy or deleting a policy. The functions can include functions of enforcing policies, including receiving requests for data, determining what portion of the data is accessible, returning the portion of data that is accessible and redacting data that is inaccessible.

In case a portion of the data is inaccessible to user U according to a data policy, the policy appliance 108 can instruct a masking subsystem 110 to redact the data. Redacting the data can hide some data from view while maintaining a uniform formatting. The policy appliance 108 provides a redact request to the masking subsystem 110. The masking subsystem 110 masks a portion of the data that is inaccessible, and return redacted data including the masked portion to the request. For example, if a policy specifies that user U can view only the last four digits of data in a column of data that contains nine digits, the masking subsystem 110 can replace the first five digits of the data with a mask (e.g., a string "XXXXX"). Some examples of data that is subject to partial or complete masking are government-issued identification numbers (e.g., social security numbers), financial card information (e.g., credit card numbers), and other personal information (e.g., home addresses, telephone numbers or birth dates). The masking subsystem 110 can then return the redacted data including the mask to a client 106 for consumption by user U. In the example shown, the masking subsystem 110 is separate from the container 107 and the policy appliance 108. In various implementations, the masking subsystem 110 can be a component of the container 107, or a component of the policy appliance 108.

Figure 2:
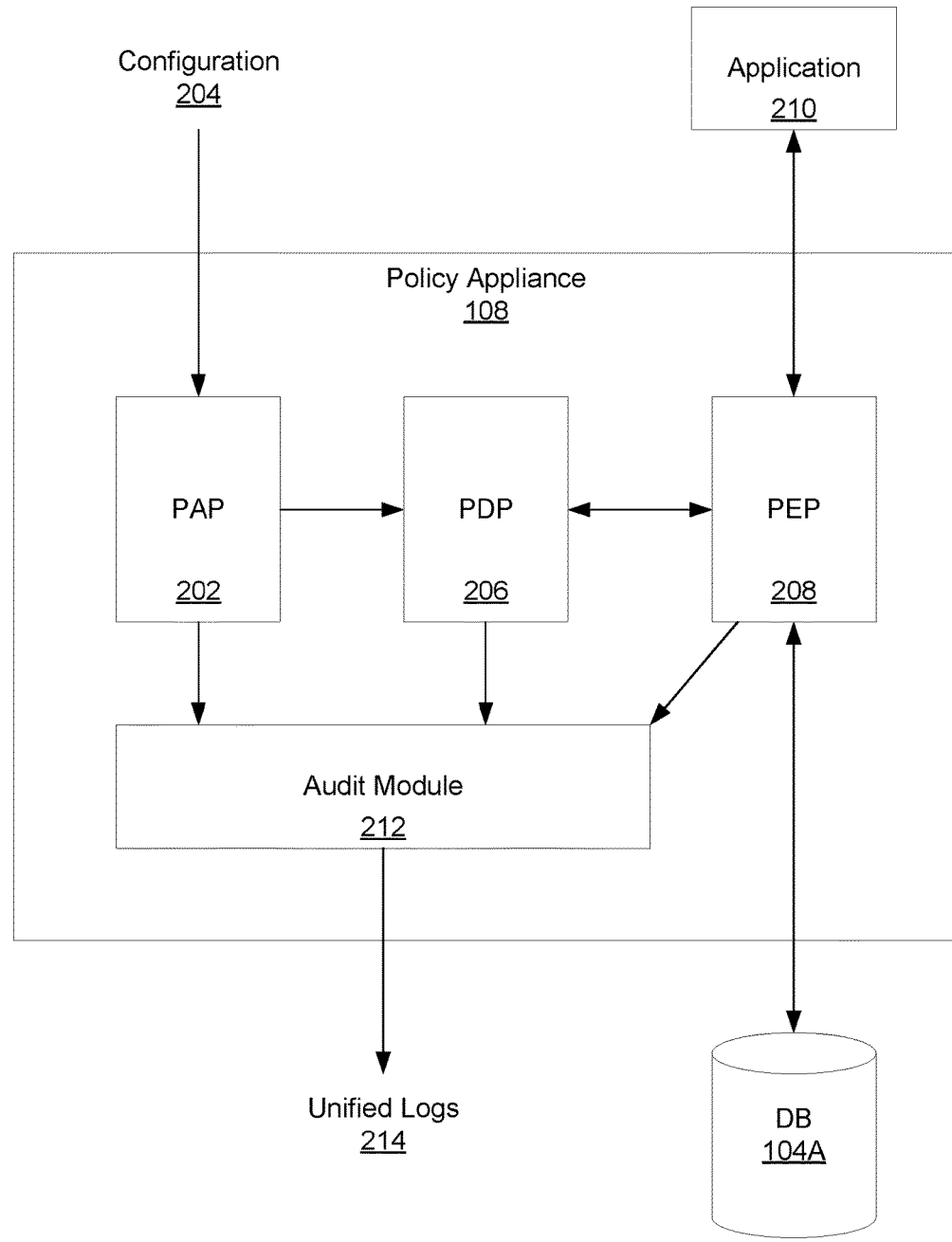
FIG. 2 illustrates an architecture of an example policy appliance.

FIG. 2 illustrates an architecture of an example policy appliance 108. The policy appliance 108 includes multiple components referred to as points. The policy appliance 108 includes a policy administration point (PAP) 202. The policy administration point 202 is a component of policy appliance 108 programmed to receive configuration information 204 from a configuration source. The configuration source can be a client 106 (of FIG. 1) or another computer. The configuration information 204 includes user identifiers and identifiers of data items, e.g., database names, table names, column names. In some implementations, the configuration information 204 can include references to rows of data that are condition-based (e.g., rows having column C1 that is greater than a value). The configuration information 204 can also include scope of access privileges of the identified user on the identified data items, e.g., read-only, read-write, create, delete, execute, partial read, and masks on content. The configuration information 204 can also include conditions on the privileges, e.g., time conditions (e.g., between hour X and hour Y), value conditions (e.g., access allowed when function f returns value A), or procedural conditions (e.g., access allowed if procedure p has already been executed by a given user).

The policy administration point 202 can receive, create or modify one or more policies specifying the access privileges of the configuration information 204. The policy administration point 202 can provide the policies to a policy decision point (PDP) 206 for applying to data requests.

The policy appliance 108 includes a policy enforcement point (PEP) 208. The policy enforcement point 208 is a component of the policy appliance programmed to receive a data request from an application 210. The application 210 can be a program executing on a client 106 (of FIG. 1). The application 210 can execute on a computer that is the same as, or different from, the configuration source providing the configuration information 204. The data request can include a representation of a user identifier of a user, and a representation of a data item, e.g., an identifier of a data item or a condition for selecting a data item. For example, the data request can include a user identifier U and data item identifiers T and D, where T is a table identifier, and D is a database identifier. The data identifiers can be embedded in a structured query language (SQL) script (e.g., "USE D; SELECT*FROM T;").

The policy enforcement point 208, upon receiving the data request, can submit the user identifier and data item identifiers or conditions in the data request to the policy decision point 206. The policy decision point 206 then determines, based on one or more policies received from the policy administration point 202, whether the user U has access privileges on database D and table T. For example, table T of database D can be a personal information table having columns "Name" that has a "String" type and "Government Identification Number" that is a nine-digit integer. The policy decision point 206 can determine that a policy associated with user U specifies that user U has read-only access privilege to table T, column Name, and has read-only access privilege to the last four digits of column "Government Identification Number" where the other five digits, when presented to user U, are to be masked by a string mask (e.g., "XXXXX"). The policy decision point 206 can then notify the policy enforcement point 208 to proceed with the SQL script, but redact the "Government Identification Number" portion of result of the script using the string mask.

Upon receiving the notification from the policy decision point 206, the policy enforcement point 208 can distribute the data request to databases on multiple data nodes for execution. For simplicity, only database 104A is shown. In this example, the policy enforcement point 208 can execute the SQL script on the database 104A. In various implementations, the policy enforcement point 208 can connect to multiple databases each having a different format. For example, one database can be a relational database, another can be an object-oriented database, a third one can be an unstructured file system. The policy enforcement point 208 can customize the data request, modified based on decision of the policy decision point 206, according to each database. The policy enforcement point 208 then dispatches customize data requests to the databases. In some implementations, multiple policy enforcement points 208 can connect to a same policy decision point 206 for decisions to access data.

Upon receiving the data from the database 104A, the policy enforcement point 208 can further enforce the policy by filtering the retrieved data. The filtering can include redacting the data to remove or mask data items that user U is not allowed to access. The policy enforcement point 208 can provide the redacted data to the application 210 as a response to the data request, directly. The policy enforcement point 208 can provide the response to the application 210 directly, through a masking subsystem 110 (of FIG. 1), or through one or more other components of the policy appliance 108 (e.g., an encryption module for encrypting data). In some implementations, the masking subsystem 110 can be a component of the policy enforcement point 208.

In the example, the policy enforcement point 208 can retrieve a data record having values corresponding two columns "Name" and "Government Identification Number." The values are "Alice" and "123456789." To enforce the policy for user U, the policy enforcement point 208 can submit the result and mask "XXXXX" to the masking subsystem 110, which then redact the record to "Alice" and "XXXXX6789." The policy appliance 108 can submit the redacted record "Alice" and "XXXXX6789" to the application 210.

In some implementations, the policy appliance 108 includes audit module 212. The audit module 212 is a component of the policy appliance 108 that executes in a same container as the policy administration point 202, policy decision point 206 and policy enforcement point 208. The audit module 212 is programmed to obtain logs from each of the policy administration point 202, policy decision point 206 and policy enforcement point 208. The logs can record events including creation, modification and deletion of policies, data requests, data request frequencies for particular users, percentage of allowed accesses and denied accesses, among other policy-related events. The audit module 212 can generate unified logs 214 for review by administrators or other privileged users. The audit module 212 can provide the unified logs 214 for presentation on client computers, e.g., client 106 of FIG. 1 or other clients.

Figure 3:
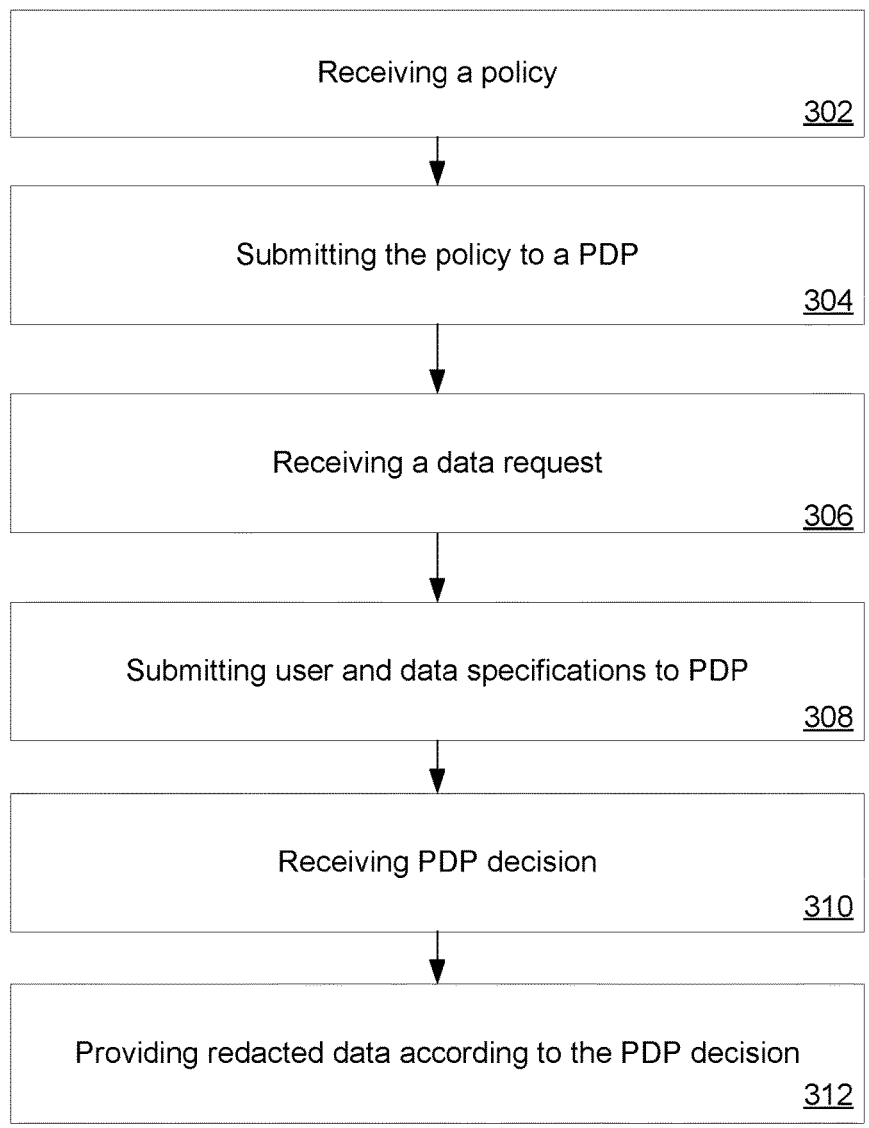
FIG. 3 is a flow diagram of an example process of managing and enforcing data security for the distributed data storage system.

FIG. 3 is a flow diagram of an example process 300 of managing and enforcing data security for the distributed data storage system.

A policy administration point (e.g., the policy administration point 202 of FIG. 2) of a policy appliance (e.g., the policy appliance 108 of FIG. 2) receives (302) a policy that defines an access privilege of a user on data stored in a database. Receiving the policy can occur during installation of the policy appliance on a container, or anytime afterwards.

The policy administration point submits (304) the policy to a policy decision point (e.g., the policy decision point 206 of FIG. 2) of the policy appliance that is configured to decide, at runtime, whether the user is permitted to access at least a portion of the data according to the policy.

A policy enforcement point (e.g., the policy enforcement point 208 of FIG. 2) of the policy appliance receives (306) a data request from an application. The data request, e.g., a query, a query script or a compute request, can include, or be associated with, a user specification specifying the user and a data specification specifying a data item of the data to access. The user specification can include a user identifier or a user group identifier. The data specification can include a database identifier, table identifier, or other information that can identify a data item. The policy enforcement point can be coupled to multiple databases. The policy enforcement point can apply the policy to data stored on each of the databases.

The policy enforcement point submits (308) the user specification and the data specification to the policy decision point. In some implementations, the policy enforcement point can execute the data request, retrieve the data from the data stores and filter the data. For various data stores, the filtering can occur at various stages. For example, when the data store includes a relational database and the data request includes a SQL query, the policy enforcement point can modify the query and then execute the modified query to retrieve the data from the database. Accordingly, the retrieved data can be already filtered. When the data store includes a filesystem storing unstructured data, the policy enforcement point can execute the request, retrieve the data and then filter the retrieved data. When the data store includes a combination of relational databases and filesystems, the policy enforcement point can perform both the query modification and the data filtering.

The policy enforcement point receives (310) a data access decision from the policy decision point. The policy decision point made the data access decision based on the policy. The data access decision specifies that the user is permitted to access a portion of the data item, not permitted to access another portion of the data item, or a combination of both. The decision can include instructions on redacting a query, or a redacted query. The policy enforcement point can retrieve data according to the instructions. For example, a table T can have columns C1, C2 and C3, where a user U has read access to only C1 and C3. For a data request including a query "SELECT*FROM T," the policy decision point can decide that C2 shall be masked by a mask, e.g., string "XXXXX." The policy enforcement point can modify the query to "SELECT C1, 'XXXXX', C3 FROM T" in which the string "XXXXX" masks values of the column C2 while keeping the column C2 in the result set.

The policy enforcement point provides (312) to the application a redacted data item as a response to the request according to the data access decision. The redacted data item can include a portion that is redacted from content that, according the policy, the user has no access privilege. The redacted portion can be a portion of the data item that is masked.

The policy appliance, including each of the policy administration point, the policy decision point, and the policy enforcement point, executes in container on a system that includes one or more computer processors. The container can be a virtual container that includes a Java virtual machine or a Linux container. The container can be an operating system of a computer. In some implementations, the policy administration point, the policy decision point, and the policy enforcement point can have a one-to-one-to-one relationship. One policy administration point corresponds to one policy enforcement point, and one policy decision point corresponds to one policy enforcement point. In some implementations, the policy administration point, the policy decision point, and the policy enforcement point can have a one-to-one-to-many relationship. One policy administration point corresponds to one policy enforcement point, and one policy decision point corresponds to multiple policy enforcement points.

In some implementations, an audit module of the policy appliance can obtain a respective audit log for each of the policy administration point, the policy decision point, and the policy enforcement point. The audit module can obtain the audit log by generating the audit log or retrieving the audit log from the corresponding component. The audit module can provide an aggregation of the audit logs for administrator review.

Figure 4:
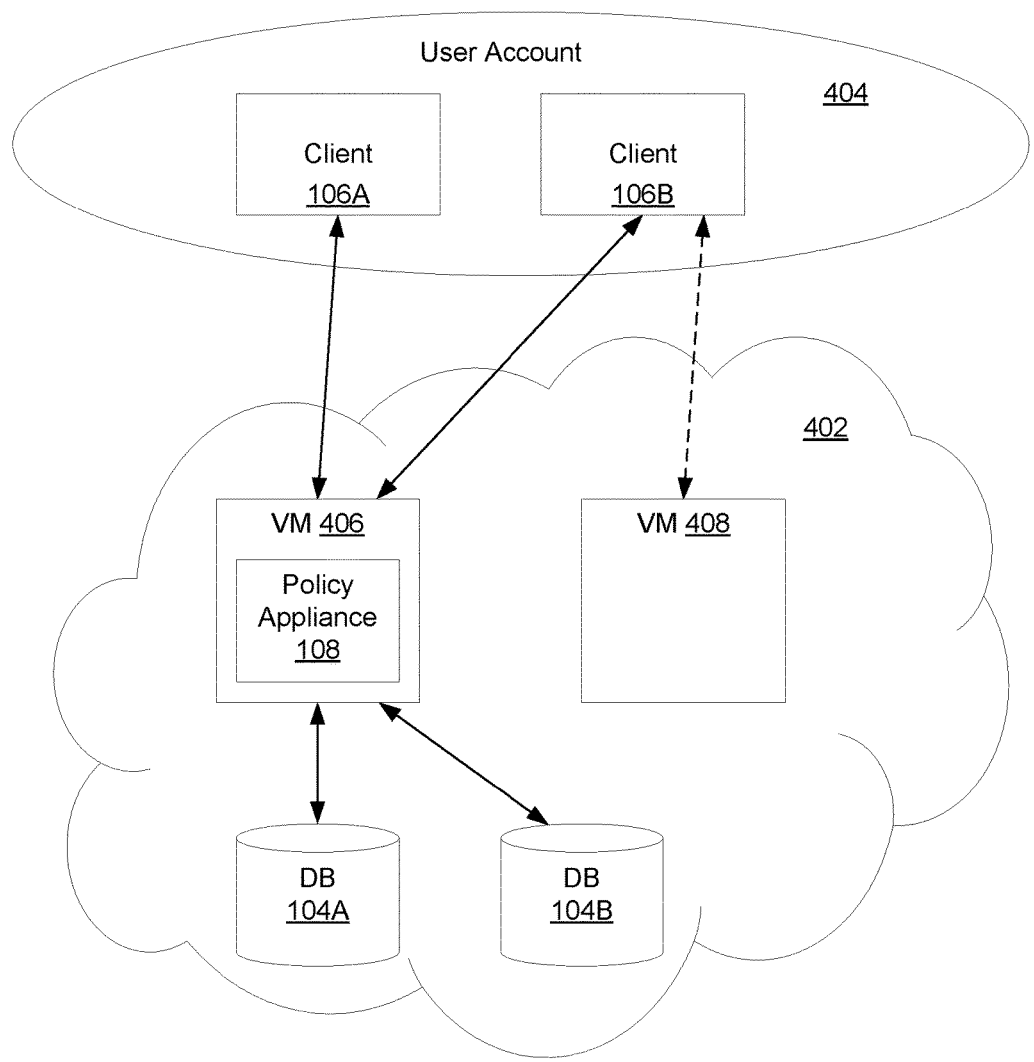
FIG. 4 illustrates an example installation of a policy appliance.

FIG. 4 illustrates an example installation of a policy appliance. A user of cloud computing service 402 can have an account 404 on the cloud computing service 402. The account 404 can correspond to a user identifier and credentials associated with the user identifier. The credentials can include, for example, a password, access privileges to individual data items, and resource usage privileges. Clients 106A and 106B are configured to access the cloud computing environment 402 upon presenting at least a portion of the credentials.

Cloud computing service 402 is a platform that includes one or more server computers providing various services including, for example, configuring programs, executing programs, storing files, and so on. In the example shown, the cloud computing service 402 provides virtual machines 406 and 408 for executing programs. Each of virtual machines 406 and 408 can be a Java virtual machine. In the example shown, both clients 106A and 106B access virtual machine 406 to perform some tasks; client 106B accesses virtual machine 408 to perform some other tasks.

The cloud computing service 402 also provides distributed storage service. The cloud computing service 402 can provide the distributed storage service on a Java-based distributed file system, e.g., an HDFS including multiple nodes, e.g., databases 104A and 104B.

Virtual machine 406 is configured to serve as a container for policy appliance 108. The policy appliance 108 is a single point of access that allows clients 106A and 106B associated with the account 404 to manage all access privileges to databases 104A and 104B. Each account 404 that corresponds to a user identifier (or other forms of identification) can be associated with a single container, respectively.

Configuration of access privileges to databases 104A and 104B can be performed in the policy appliance 108 executing in virtual machine 406. Each of the clients 106A and 106B can manage the configuration by, for example, providing a set of parameters defining access privileges to the virtual machine 406. A client, e.g., client 106A associated with account 404, can request HDFS access. In case no access configuration has been performed before the request, the cloud computing service 402 can create the virtual machine 406 according to a virtual machine template, and install the policy appliance 108 on the virtual machine 406. The cloud computing service 402 then provides default configuration parameters for accessing the HDFS to the policy appliance 108, and allows the client 106A to load detailed access privilege configuration parameters to the newly created virtual machine 406 and policy appliance 108. Cloud computing service 402 can provide different containers, e.g., different virtual machines, to different accounts.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or a "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving, by a policy enforcement point of a policy appliance, a data request from an application, the request including a user specification specifying the user and a data specification specifying a data item to be accessed, the policy enforcement point being connected to a first database having a first database format and a second database having a second database format;
submitting, by the policy enforcement point, the user specification and the data specification to a policy decision point of the policy appliance, the policy decision point being configured to decide whether the user is permitted to access at least a portion of the data item according to a policy that defines an access privilege of the user on data;
receiving, by the policy enforcement point and from the policy decision point, a data access decision that is made by the policy decision point according to the policy, the data access decision specifying that the user is permitted to access a portion of the data item;
customizing, by the policy enforcement point, the data request for each of the databases based on the data access decision and a respective database format, including changing the data request into a first customized query according to the first database format and changing the data request into a second customized query according to the second database format, the customized query preventing at least a first portion of the data item from being retrieved from the databases;
retrieving, by the policy enforcement point, a second portion of the data item from the databases as a response to the customized query, the second portion being different from the first portion; and
providing, by the policy enforcement point to the application, the second portion of the data item,
wherein the policy appliance, including the policy decision point, and the policy enforcement point, executes in a container on a system that includes one or more computer processors.

2. The method of claim 1, wherein the container is a virtual container that includes a Java virtual machine or a virtual container that includes a Linux container, and the database is hosted on a respective node or a cluster of nodes as in a Hadoop Distributed File System (HDFS).

3. The method of claim 1, wherein the container is a virtualized server that provides an isolated, self-contained, and individually configured user space in a cloud-computing environment.

4. The method of claim 1, wherein the first portion of the data item include content that, according to the policy, the user has no access privilege.

5. The method of claim 1, further comprising:
obtaining, by an audit module of the policy appliance, a respective audit log for each of the policy decision point and the policy enforcement point; and
providing an aggregation of the audit logs for administrator review.

6. The method of claim 1, wherein the policy enforcement point is coupled to the first and the second databases, and the policy is applied to data stored on each of the databases.

7. The method of claim 1, wherein the policy decision point, and the policy enforcement point have a one-to-one relationship, wherein one policy decision point corresponds to one policy enforcement point.

8. The method of claim 1, wherein the policy decision point, and the policy enforcement point have a one-to-many relationship, wherein one policy decision point corresponds to a plurality of policy enforcement points.

9. A system comprising:
one or more processors; and
a non-transitory storage device storing computer instructions operable to cause the one or more processors to perform operations comprising:
receiving, by a policy enforcement point of a policy appliance, a data request from an application, the request including a user specification specifying the user and a data specification specifying a data item to be accessed, the policy enforcement point being connected to a first database having a first database format and a second database having a second database format;
submitting, by the policy enforcement point, the user specification and the data specification to a policy decision point of the policy appliance, the policy decision point being configured to decide whether the user is permitted to access at least a portion of the data item according to a policy that defines an access privilege of the user on data;
receiving, by the policy enforcement point and from the policy decision point, a data access decision that is made by the policy decision point according to the policy, the data access decision specifying that the user is permitted to access a portion of the data item;
customizing, by the policy enforcement point, the data request for each of the databases based on the data access decision and a respective database format, including changing the data request into a first customized query according to the first database format and changing the data request into a second customized query according to the second database format, the customized query preventing at least a first portion of the data item from being retrieved from the databases;
retrieving, by the policy enforcement point, a second portion of the data item from the databases as a response to the customized query, the second portion being different from the first portion; and
providing, by the policy enforcement point to the application, the second portion of the data item,
wherein the policy appliance, including the policy decision point, and the policy enforcement point, executes in a container on a system that includes one or more computer processors.

10. The system of claim 9, wherein the container is a virtual container that includes a Java virtual machine or a virtual container that includes a Linux container, and the database is hosted on a respective node or a cluster of nodes as in a Hadoop Distributed File System (HDFS).

11. The system of claim 9, wherein the container is a virtualized server that provides an isolated, self-contained, and individually configured user space in a cloud-computing environment.

12. The system of claim 9, wherein the first portion of the data item include content that, according to the policy, the user has no access privilege.

13. The system of claim 9, the operations comprising:
obtaining, by an audit module of the policy appliance, a respective audit log for each of the policy decision point and the policy enforcement point; and
providing an aggregation of the audit logs for administrator review.

14. The system of claim 9, wherein the policy enforcement point is coupled to the first and the second databases, and the policy is applied to data stored on each of the databases.

15. A non-transitory storage device storing computer instructions operable to cause one or more processors to perform operations comprising:
- receiving, by a policy enforcement point of a policy appliance, a data request from an application, the request including a user specification specifying the user and a data specification specifying a data item to be accessed, the policy enforcement point being connected to a first database having a first database format and a second database having a second database format;
- submitting, by the policy enforcement point, the user specification and the data specification to a policy decision point of the policy appliance, the policy decision point being configured to decide whether the user is permitted to access at least a portion of the data item according to a policy that defines an access privilege of the user on data;
- receiving, by the policy enforcement point and from the policy decision point, a data access decision that is made by the policy decision point according to the policy, the data access decision specifying that the user is permitted to access a portion of the data item;
- customizing, by the policy enforcement point, the data request for each of the databases based on the data access decision and a respective database format, including changing the data request into a first customized query according to the first database format and changing the data request into a second customized query according to the second database format, the customized query preventing at least a first portion of the data item from being retrieved from the databases;
- retrieving, by the policy enforcement point, a second portion of the data item from the databases as a response to the customized query, the second portion being different from the first portion; and
- providing, by the policy enforcement point to the application, the second portion of the data item,
- wherein the policy appliance, including the policy decision point, and the policy enforcement point, executes in a container on a system that includes one or more computer processors.

16. The non-transitory storage device of claim 15, wherein the container is a virtual container that includes a Java virtual machine or a virtual container that includes a Linux container, and the database is hosted on a respective node or a cluster of nodes as in a Hadoop Distributed File System (HDFS).

17. The non-transitory storage device of claim 15, wherein the container is a virtualized server that provides an isolated, self-contained, and individually configured user space in a cloud-computing environment.

18. The non-transitory storage device of claim 15, wherein the first portion of the data item include content that, according to the policy, the user has no access privilege.

19. The non-transitory storage device of claim 15, the operations further comprising:
- obtaining, by an audit module of the policy appliance, a respective audit log for each of the policy decision point, and the policy enforcement point; and
- providing an aggregation of the audit logs for administrator review.

* * * * *